United States Patent
Chen et al.

(10) Patent No.: US 10,942,429 B2
(45) Date of Patent: Mar. 9, 2021

(54) PROJECTOR, ELECTRONIC DEVICE HAVING PROJECTOR AND ASSOCIATED CONTROL METHOD

(71) Applicant: HIMAX TECHNOLOGIES LIMITED, Tainan (TW)

(72) Inventors: Kuan-Ming Chen, Tainan (TW); Han-Yi Kuo, Tainan (TW); Li-Chiu Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 284 days.

(21) Appl. No.: 16/149,075

(22) Filed: Oct. 1, 2018

(65) Prior Publication Data
US 2020/0103730 A1    Apr. 2, 2020

(51) Int. Cl.
| | |
|---|---|
| G02B 5/02 | (2006.01) |
| G03B 21/00 | (2006.01) |
| G02F 1/137 | (2006.01) |
| G03B 21/20 | (2006.01) |
| G02B 27/42 | (2006.01) |
| H04N 13/254 | (2018.01) |
| G06T 7/521 | (2017.01) |

(52) U.S. Cl.
CPC ....... G03B 21/006 (2013.01); G02B 27/4205 (2013.01); G02F 1/137 (2013.01); G03B 21/2033 (2013.01); G06T 7/521 (2017.01); H04N 13/254 (2018.05); G02F 2001/13756 (2013.01); G06T 2207/10028 (2013.01); G06T 2207/10048 (2013.01)

(58) Field of Classification Search
CPC ...... G02B 5/1842; G02B 27/18; G02B 27/30; G02B 27/42; G02B 27/4205; G02B 27/4222; G02B 27/4233; G02B 27/60; G02B 13/0055; G02B 13/0085; G02B 19/0061; G03B 17/54; G03B 21/00; G03B 21/006; G03B 21/14; G03B 21/2033; G03B 21/206; G01B 11/22; G01B 11/25; G01B 11/2513; G02F 1/1334; G02F 1/137; G02F 1/13718; G02F 2001/13756; G06T 7/50; G06T 7/521; G06T 2207/10028; G06T 2207/10048; G01R 27/14; H04N 13/20; H04N 13/204; H04N 13/254; H04N 9/3152; H04N 9/3161; H04N 9/3179; H04N 5/225; H04N 5/33
USPC .................................. 359/642, 738
See application file for complete search history.

(56) References Cited

U.S. PATENT DOCUMENTS

2017/0187997 A1* 6/2017 Hsiao ................ G01B 11/25

FOREIGN PATENT DOCUMENTS

| CN | 103034037 A | 4/2013 |
|---|---|---|
| TW | 201723629 A | 7/2017 |

* cited by examiner

Primary Examiner — Joseph P Martinez
(74) Attorney, Agent, or Firm — Winston Hsu

(57) ABSTRACT

The present invention provides a projector including a light-emitting device, a diffraction optical element (DOE) and a switchable diffuser. The light-emitting device is arranged for generating a laser beam. The switchable diffuser is controlled by a control signal to diffuse or scatter received lights or not diffuse or scatter the received lights, wherein the laser beam passes through the DOE and the switchable diffuser to generate an output image of the projector.

16 Claims, 8 Drawing Sheets

(a)

(b)

PROJECTOR, ELECTRONIC DEVICE HAVING PROJECTOR AND ASSOCIATED CONTROL METHOD

BACKGROUND OF THE INVENTION

1. Field of the Invention

The present invention relates to a projector, and more particularly, to a projector having diffraction optical element.

2. Description of the Prior Art

In order to obtain 3D images, an electronic device may use a projector for projecting a special pattern to a surrounding region, and use camera to capture the image having the special pattern, and the captured image is analyzed by a processor to obtain the depth information of the image. In addition, in order to identify the contents of the captured image, the electronic device may further use a light illuminator to increase the ambient light to make the captured image be more clearly. However, setting the projector and the light illuminator in the electronic device may increase the design loading and the manufacturing costs.

SUMMARY OF THE INVENTION

It is therefore an objective of the present invention to provide a projector, which can be controlled to serve as the pattern projector or the light illuminator, to solve the above-mentioned problems.

According to one embodiment of the present invention, a projector comprises a light-emitting device, a diffraction optical element (DOE) and a switchable diffuser. The light-emitting device is arranged for generating a laser beam. The switchable diffuser is controlled by a control signal to diffuse or scatter received lights or not diffuse or scatter the received lights, wherein the laser beam passes through the DOE and the switchable diffuser to generate an output image of the projector.

According to another embodiment of the present invention, an electronic device comprises a projector and a camera module. The projector comprises a light-emitting device, a DOE and a switchable diffuser. The light-emitting device is arranged for generating a laser beam. The switchable diffuser is controlled by a control signal to diffuse or scatter received lights or not diffuse or scatter the received lights, wherein the laser beam passes through the DOE and the switchable diffuser to generate an output image of the projector. The camera module is arranged for capturing the region of the surrounding environment to generate image data.

According to another embodiment of the present invention, a control method of a projector is provided, wherein the projector comprises a light-emitting device, a DOE and a switchable diffuser, and the control method comprises: receiving a control signal to control the switchable diffuser to operate in a first mode or a second mode; when the switchable diffuser is controlled to operate in the first mode, the switchable diffuser does not diffuse or scatter the received light; and when the switchable diffuser is controlled to operate in the second mode, the switchable diffuser diffuses or scatters the received light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
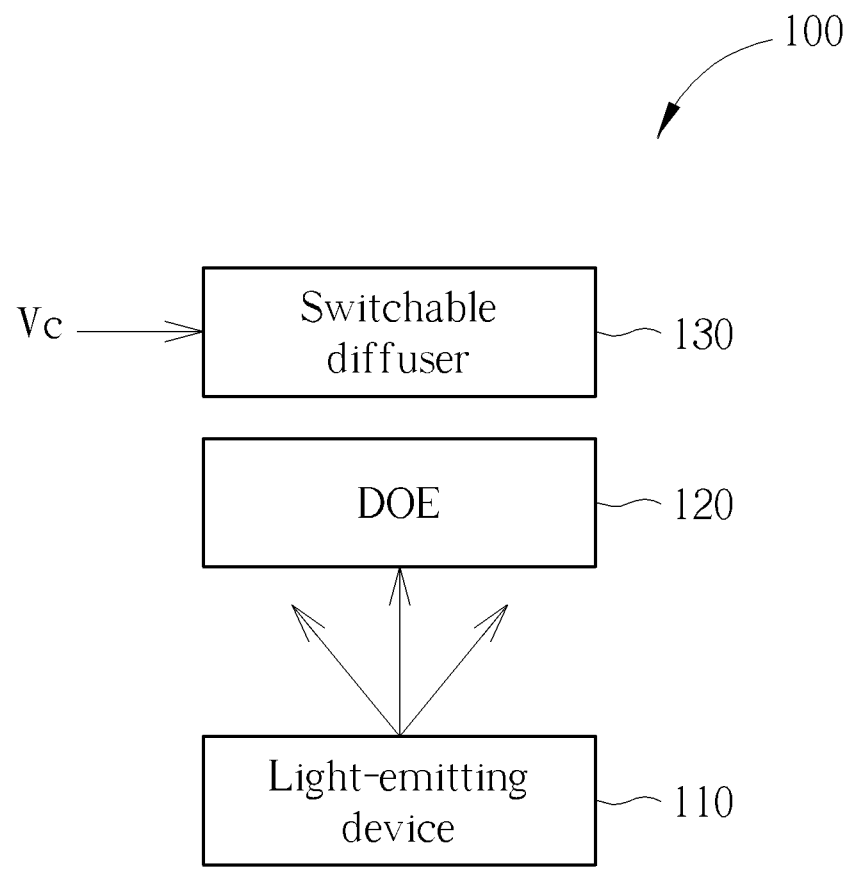
FIG. 1 is a diagram illustrating a projector according to a first embodiment of the present invention.

FIG. 1 is a diagram illustrating a projector 100 according to a first embodiment of the present invention. As shown in FIG. 1, the projector 100 comprises a light-emitting device 110, a diffraction optical element (DOE) 120 and a switchable diffuser 130. In this embodiment, the light-emitting device 110 may be a laser diode or a vertical-cavity surface-emitting laser (VCSEL), the DOE 120 may be regarded as a pattern generator, and the DOE 120 may be imprinted on a surface of a substrate, and the switchable diffuser 130 is controlled by a control signal Vc to serve as a diffuser or not.

Figure 2:
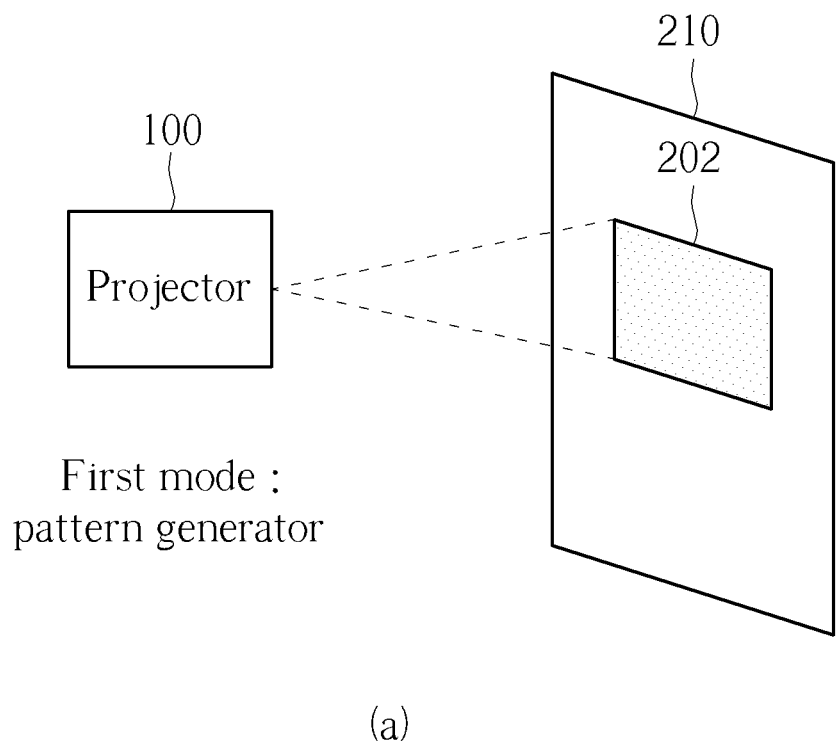
FIG. 2 is a diagram illustrating a first mode and a second mode of the projector according to one embodiment of the present invention.
Figure 2:
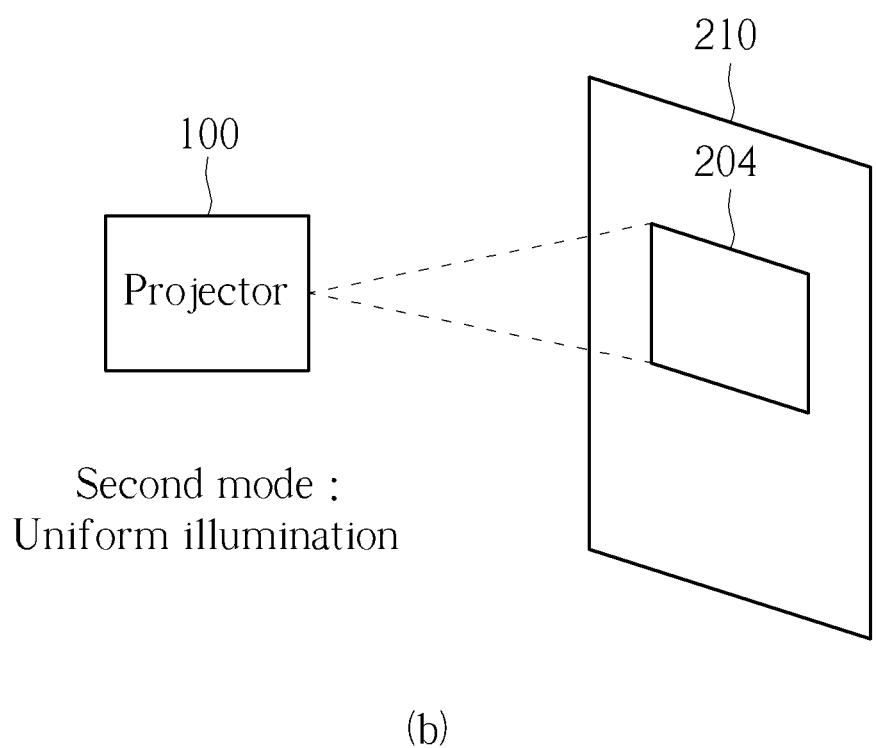

In the operations of the projector 100, the projector 100 can selectively operate as a pattern generator or an uniform illuminator based on the operations of the switchable diffuser 130. Refer to FIG. 1 and FIG. 2 together, when the projector 100 is required to serve as the pattern generator (first mode), the light-emitting device 110 starts to generate an infrared laser beam, and the infrared laser beam passes through the DOE 120 to generate an image having the special pattern of the DOE 120, and the switchable diffuser 130 is controlled by the control signal Vc to operate as a transparent plate to allow the image to pass through, and the output image 202 generated by the projector 100 is projected on an object 210 in a surrounding environment. In the first mode of the projector 100, because the switchable diffuser 130 does not diffuse or scatter the received light, the output image 202 of the projector 100 has the special pattern (e,g, the dots shown in FIG. 2(a)) of the DOE 120. In the other case, when the projector 100 is required to serve as the uniform illuminator (second mode), the light-emitting device 110 starts to generate the infrared laser beam, and the infrared laser beam passes through the DOE 120 to generate an image having the special pattern, and the switchable diffuser 130 is controlled by the control signal Vc to operate as the diffuser to diffuse or scatter the received light, to make the output image 204 of the projector 100 is uniform illumination. In the second mode of the projector 100, because the switchable diffuser 130 diffuses or scatters the received light, the output image 204 of the projector 100 dose not have the special pattern of the DOE 120 (e.g. FIG. 2(b)).

When the projector 100 operates in the first mode, the projector 100 serves as the pattern generator to project the output image 202 having the special pattern to the object 210, and the object 210 having the output image 202 thereon can be captured by a camera module to obtain the 3D image. When the projector 100 operates in the second mode, the projector 100 serves as the illuminator to increase the ambient light (i.e. brighten the object 210) to make the captured image be more clearly. Therefore, because the projector 100 can be controlled to serve as the pattern generator or the illuminator, the designs of an electronic device having the projector 100 are easier and more flexible, and the manufacturing cost is better than the prior art electronic device having the distinct pattern generator and the illuminator.

Figure 3:
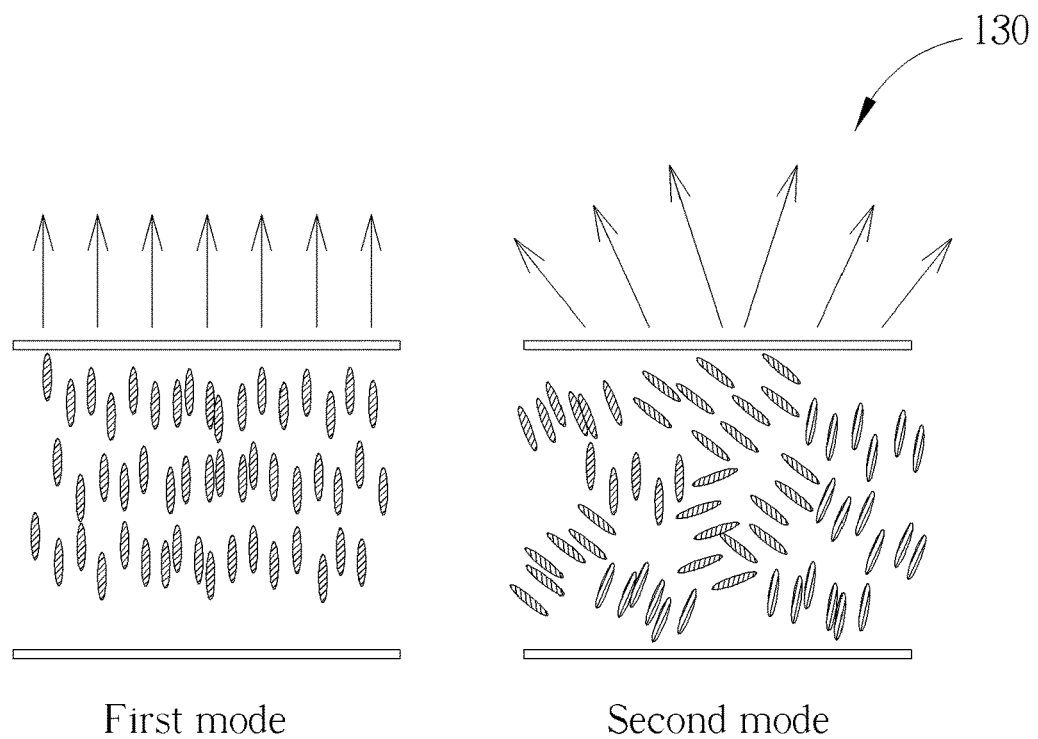
FIG. 3 is a diagram illustrating a switchable diffuser according to one embodiment of the present invention.

In this embodiment, the switchable diffuser 130 may be implemented by a liquid crystal device as shown in FIG. 3. In the embodiment, the switchable diffuser 130 has two substrates and a liquid crystal layer, and the modes of the switchable diffuser 130 may be controlled by applying voltage differences to the two substrates. In one case, if the switchable diffuser 130 is normally transparent, the switchable diffuser 130 may operate as the transparent plate (first mode) when no voltage difference is between the two substrates, and the switchable diffuser 130 may operate as the diffuser (second mode) when a suitable voltage difference is between the two substrates. In the other case, if the switchable diffuser 130 is normally opaque, the switchable diffuser 130 may operate as the transparent plate (first mode) when a suitable voltage difference is between the two substrates, and the switchable diffuser 130 may operate as the diffuser (second mode) when no voltage difference is between the two substrates.

The switchable diffuser 130 shown in FIG. 3 is for illustrative purposes only, not a limitation of the present invention. As long as the switchable diffuser 130 can selectively serve as the diffuser or not, the switchable diffuser 130 may be implemented by another element such as a polymer composite, an electrowetting or an electrophoresis.

Figure 4:
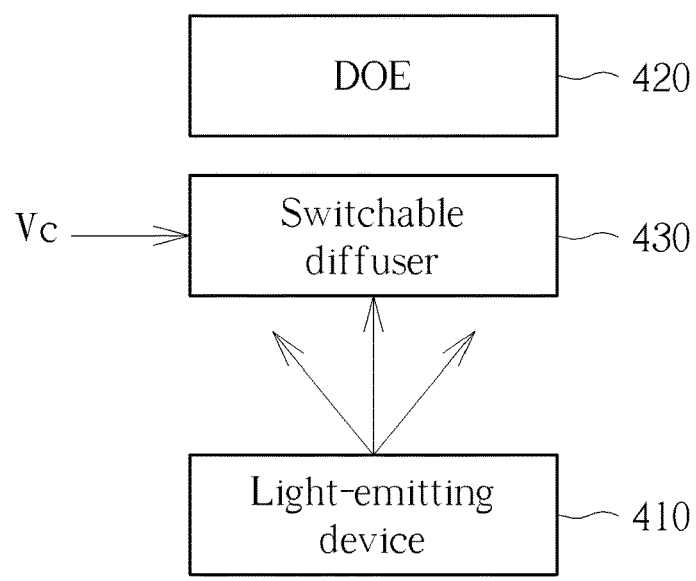
FIG. 4 is a diagram illustrating a projector according to a second embodiment of the present invention.

FIG. 4 is a diagram illustrating a projector 400 according to a second embodiment of the present invention. As shown in FIG. 4, the projector 400 comprises a light-emitting device 410, a DOE 420 and a switchable diffuser 430. In this embodiment, the light-emitting device 410 may be a laser diode or a VCSEL, the DOE 420 may be regarded as a pattern generator, and the switchable diffuser 430 is controlled by a control signal Vc to serve as a diffuser or not.

In the operations of the projector 400, the projector 400 can selectively operate as a pattern generator or an uniform illuminator based on the operations of the switchable diffuser 430. The projector 400 is similarly to the projector 100 shown in FIG. 1, and the only difference between the projector 400 and the projector 100 is the positions of the DOE 420 and the switchable diffuser 430. Because a person skilled in the art should understand the operations of the projector 400 after reading the embodiments shown in FIGS. 1-3, further descriptions are omitted here.

Figure 5:
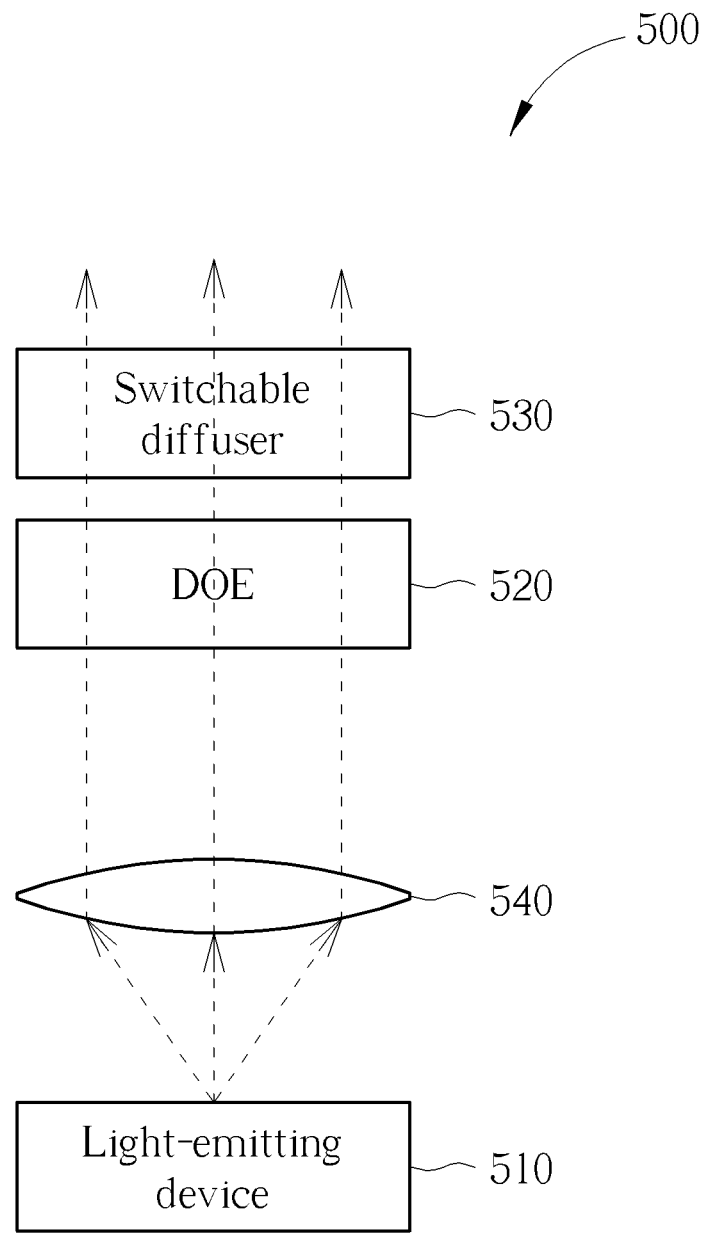
FIG. 5 is a diagram illustrating a projector according to a third embodiment of the present invention.

FIG. 5 is a diagram illustrating a projector 500 according to a third embodiment of the present invention. As shown in FIG. 5, the projector 400 comprises a light-emitting device 510, a DOE 520, a switchable diffuser 530 and a lens module 540. In this embodiment, the light-emitting device 510 may be a laser diode or a VCSEL, the DOE 520 may be regarded as a pattern generator, and the switchable diffuser 530 is controlled by a control signal Vc to serve as a diffuser or not.

In the operations of the projector 500, the projector 500 can selectively operate as a pattern generator or an uniform illuminator based on the operations of the switchable diffuser 530. The projector 500 is similarly to the projector 100 shown in FIG. 1, and the only difference between the projector 500 and the projector 100 is that the projector 500 further has a lens module 540 between the light-emitting device 510 and the DOE 520. Because a person skilled in the art should understand the operations of the projector 500 after reading the embodiments shown in FIGS. 1-3, further descriptions are omitted here.

Figure 6:
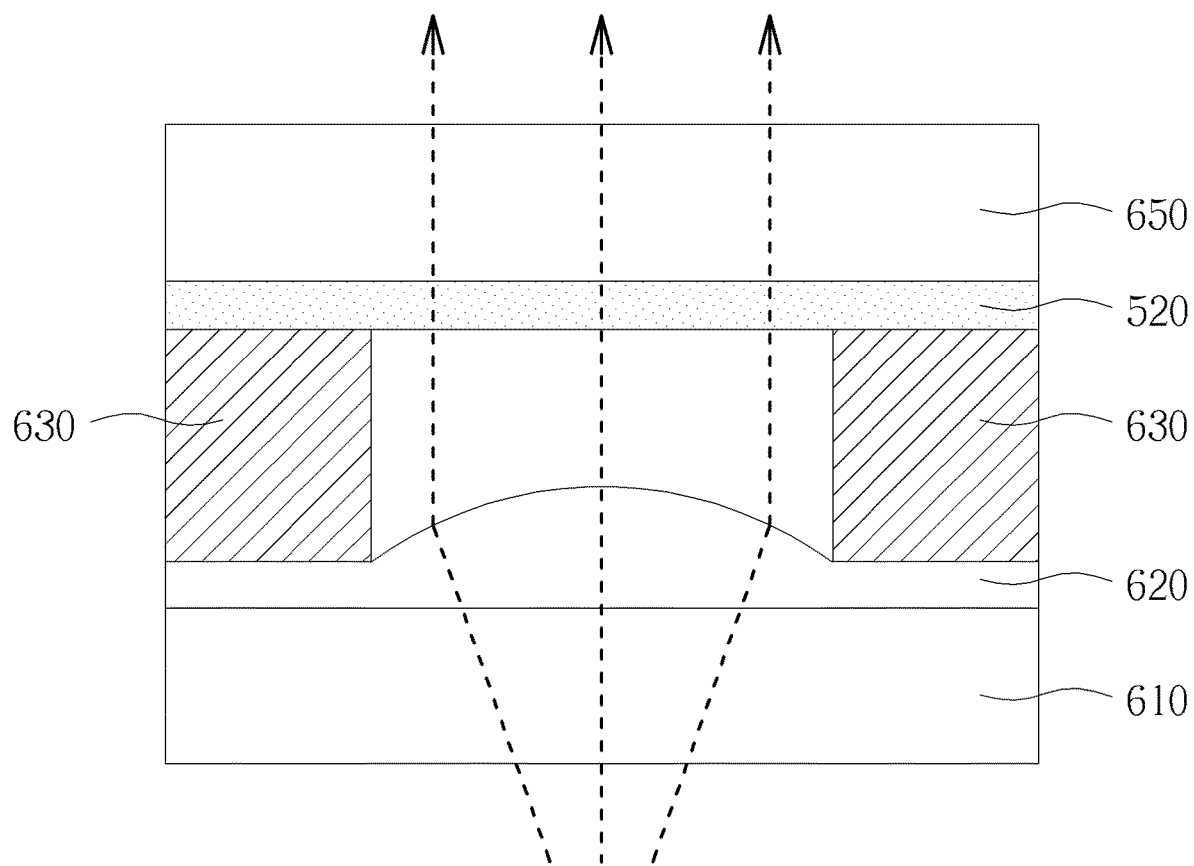
FIG. 6 shows the DOE and the lens module according to one embodiment of the present invention.

In the embodiment shown in FIG. 5, the DOE 520 and the lens module 540 may be manufactured together, for example, the DOE 520 may be imprinted on a surface of a substrate of the lens module 540. FIG. 6 shows the DOE 520 and the lens module 540 according to one embodiment of the present invention. As shown in FIG. 6, the lens module 540 comprises a first substrate 610, a convex lens 620 imprinted on a surface of the first substrate 610, a second substrate 650, and spacers 630, wherein the DOE 520 may be imprinted on one surface (i.e. any one of the upper surface and the lower surface) of the second substrate 650.

Figure 7:
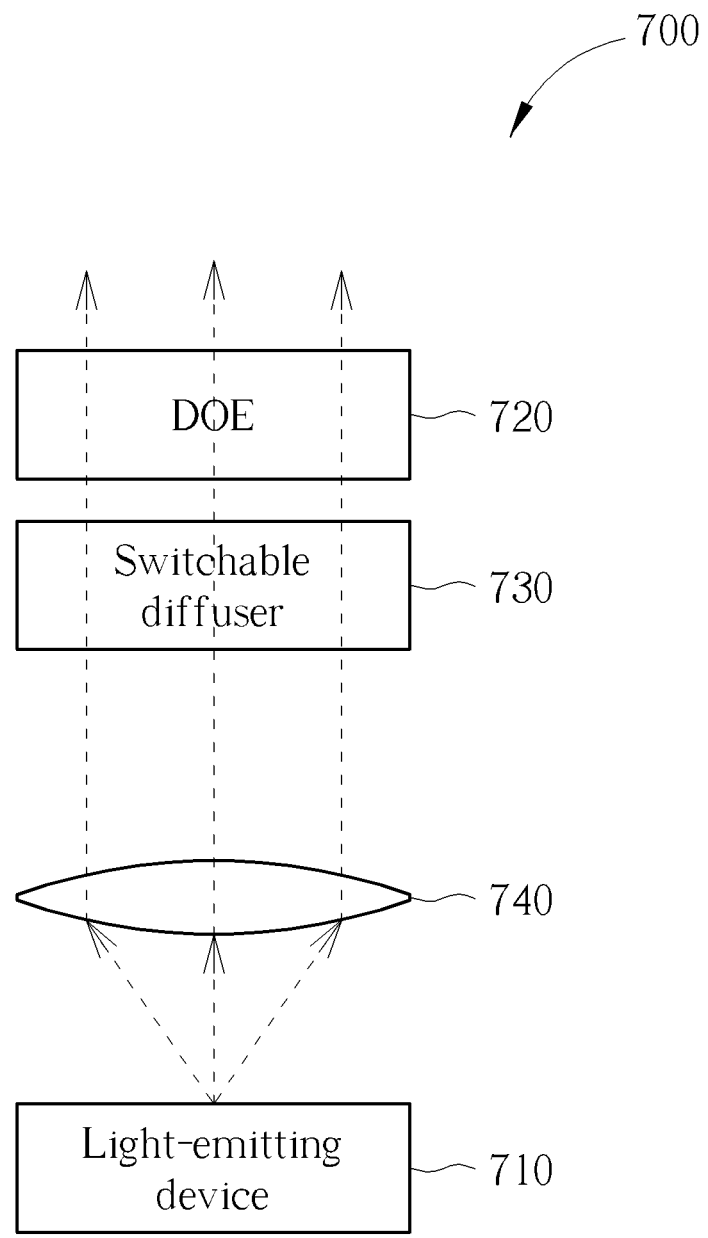
FIG. 7 is a diagram illustrating a projector according to a fourth embodiment of the present invention.

FIG. 7 is a diagram illustrating a projector 700 according to a fourth embodiment of the present invention. As shown in FIG. 7, the projector 700 comprises a light-emitting device 710, a DOE 720, a switchable diffuser 730 and a lens module 740. In this embodiment, the light-emitting device 710 may be a laser diode or a VCSEL, the DOE 720 may be regarded as a pattern generator, and the switchable diffuser 730 is controlled by a control signal Vc to serve as a diffuser or not.

In the operations of the projector 700, the projector 700 can selectively operates as a pattern generator or an uniform illuminator based on the operations of the switchable diffuser 730. The projector 700 is similarly to the projector 500 shown in FIG. 5, and the only difference between the projector 700 and the projector 500 is the positions of the DOE 720 and the switchable diffuser 730. Because a person skilled in the art should understand the operations of the projector 700 after reading the embodiments shown in FIGS. 1-3 and 5, further descriptions are omitted here.

In other embodiments, the lens module may be manufactured with the switchable diffuser, for example, the lens module 740 shown in FIG. 7 may be manufactured on a surface of a substrate of the switchable diffuser 730, or the switchable diffuser 130 shown in FIG. 1 may have a lens module manufactured thereon.

Figure 8:
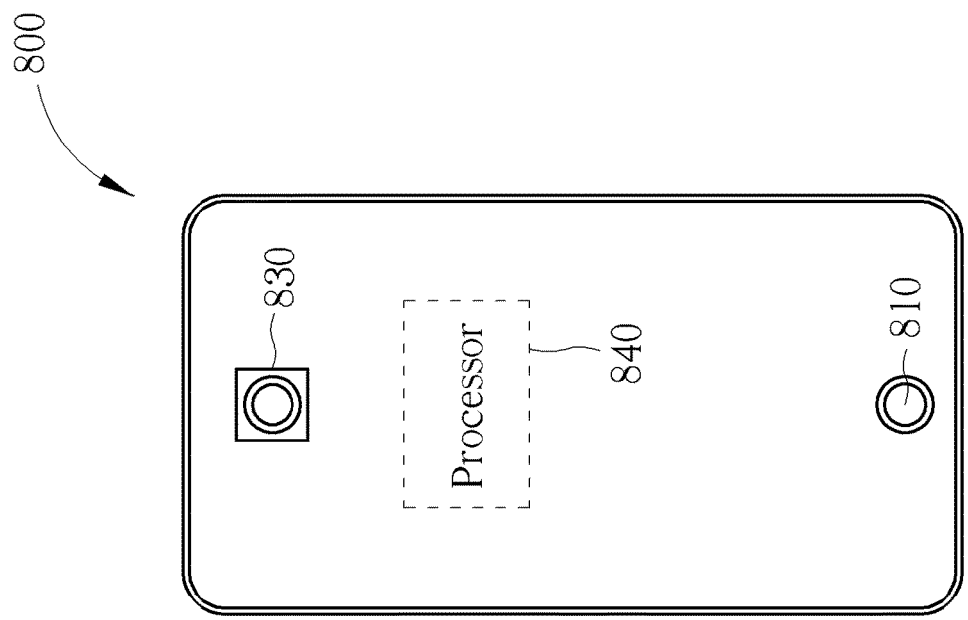
FIG. 8 is a diagram illustrating an electronic device according to one embodiment of the present invention.

FIG. 8 is a diagram illustrating an electronic device 800 according to one embodiment of the present invention. As shown in FIG. 8, the electronic device 800 is a smart phone, and the electronic device 800 comprises the projector 810, a camera module 830 and a processor 840. In this embodiment, the projector 810 may be any one of the projector 100/400/500/700, and is embedded in a back side of the electronic device 800, and the projector 810 is used to project the infrared output image with or without the special pattern to a region of a surrounding environment. Then, the camera module 830 captures the region of the surrounding environment to generate image data. Finally, the processor 840 analyzes the image data to obtain depth information of the image data to generate a 3D image when the infrared output image has the special pattern (first mode), and the processor 840 does not analyze the image data to obtain depth information of the image data when the infrared output image serves as the uniform illumination (second mode).

In one embodiment, the projector 810 may be controlled to operate in the second mode before the first mode. Specifically, the projector 810 may be controlled to project the uniform illumination to brighten the object, and the processor 840 may identify the object within the image data captured by the camera module 830; then the projector 810 is controlled to project the output image having the special pattern for the processor 840 analyzing the image data to obtain depth information of the image data. In another embodiment, the projector 810 may be controlled to operate in the first mode and the second mode alternately.

Figure 9:
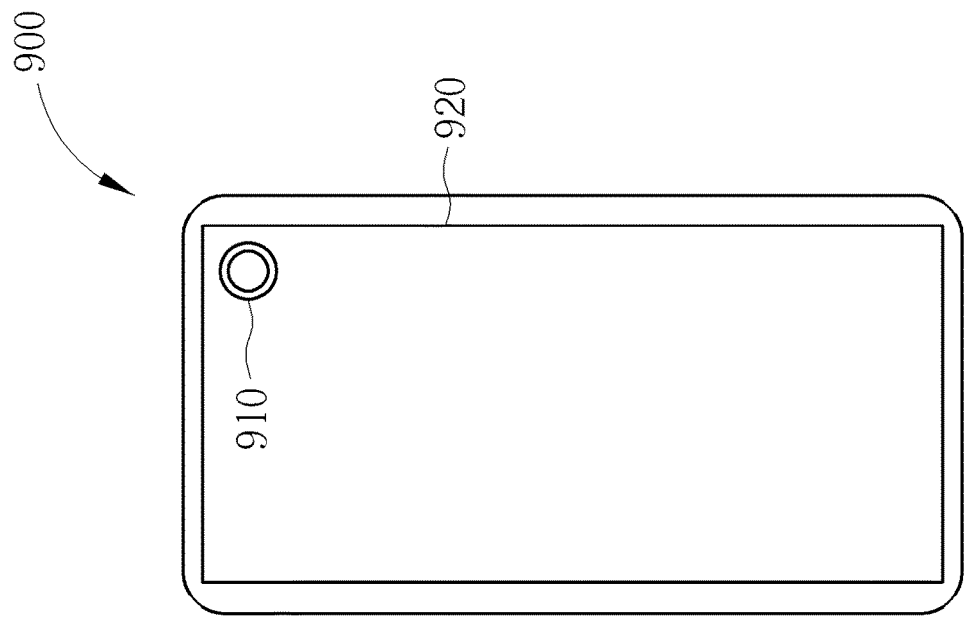
FIG. 9 is a diagram illustrating an electronic device according to another embodiment of the present invention.

In the embodiment show in FIG. 8, the projector 810 is embedded in the back side of the electronic device 800. In another embodiment shown in FIG. 9, however, the projector can be positioned in the face of the electronic device, and the projector may be integrated with a liquid crystal display panel. As shown in FIG. 9, an electronic device 900 comprises at least a projector 910 and a liquid crystal display panel 920, wherein the projector 910 may be any one of the projector 100/400/500/700, and the switchable diffuser of the projector 910 is implemented by part of the liquid crystal display panel 920.

Figure 10:
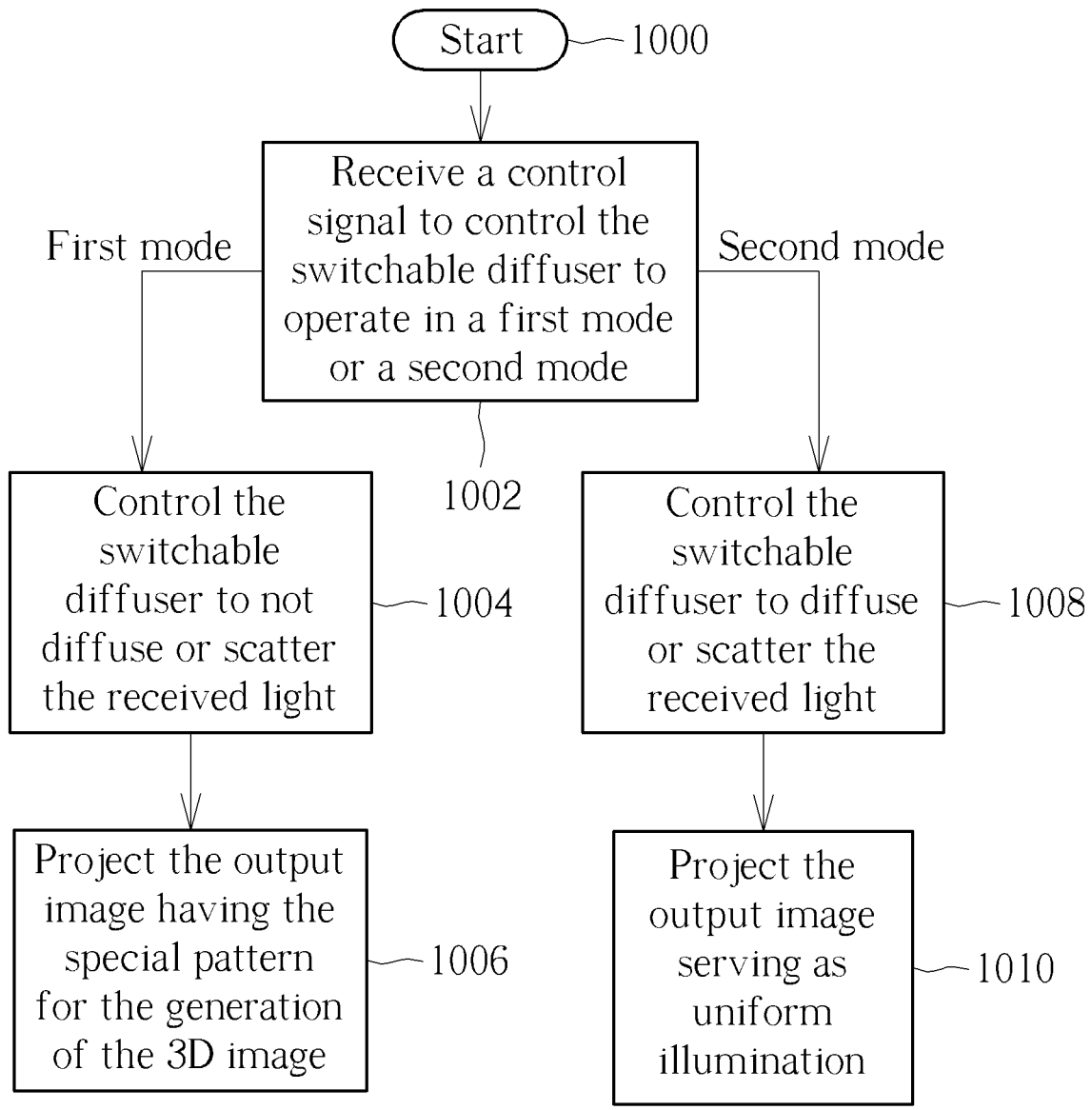
FIG. 10 is flowchart a control method of a projector according to one embodiment of the present invention.

FIG. 10 is flowchart a control method of a projector according to one embodiment of the present invention. Referring to FIGS. 1-10, the flowchart is as follows.

Step 1000: the flow starts.

Step 1002: receive a control signal to control the switchable diffuser to operate in a first mode or a second mode; if the switchable diffuser operates in the first mode, the flow enters Step 1004; and if the switchable diffuser operates in the second mode, the flow enters Step 1008.

Step 1004: control the switchable diffuser to not diffuse or scatter the received light.

Step 1006: project the output image having the special pattern for the generation of the 3D image.

Step 1008: control the switchable diffuser to diffuse or scatter the received light.

Step 1010: project the output image serving as uniform illumination.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
 a light-emitting device, for generating a laser beam;
 a diffraction optical element (DOE); and
 a switchable diffuser, wherein the switchable diffuser is controlled by a control signal to diffuse or scatter received lights or not diffuse or scatter the received lights;
 wherein the laser beam passes through the DOE and the switchable diffuser to generate an output image of the projector;
 wherein the switchable diffuser is controlled by the control signal to have a first mode or a second mode; if the switchable diffuser operates in the first mode, the received lights directly passes through the switchable diffuser, without being diffused or scattered by the switchable diffuser; if the switchable diffuser operates in the second mode, the switchable diffuser diffuses or scatter the received lights; and the switchable diffuser is controlled to operate in the first mode and the second mode alternately.

2. The projector of claim 1, wherein the DOE has a specific pattern, and if the switchable diffuser operates in the first mode, the output image of the projector has the specific pattern; and if the switchable diffuser operates in the second mode, the output image of the projector serves as uniform illumination.

3. The projector of claim 1, wherein the laser beam pass through the DOE to generate an image, and the image passes through the switchable diffuser to generate the output image of the projector.

4. The projector of claim 3, further comprising a lens module positioned between the light-emitting device and the DOE.

5. The projector of claim 1, wherein the laser beam pass through the switchable diffuser to generate an image, and the image passes through the DOE to generate the output image of the projector.

6. The projector of claim 5, further comprising a lens module positioned between the light-emitting device and the switchable diffuser.

7. The projector of claim 1, further comprising:
 a lens module, wherein the DOE is imprinted on a surface of a substrate of the lens module.

8. The projector of claim 1, wherein the switchable diffuser is implemented by a liquid crystal, a polymer composite, an electrowetting or an electrophoresis.

9. The projector of claim 1, wherein the projector is built in an electronic device having a liquid display panel, and part of the liquid display panel serves as the switchable diffuser.

10. An electronic device, comprising:
 a projector, comprising:
  a light-emitting device, for generating a laser beam;
  a diffraction optical element (DOE); and
  a switchable diffuser, wherein the switchable diffuser is controlled by a control signal to diffuse or scatter received lights or not diffuse or scatter the received lights; wherein the laser beam passes through the DOE and the switchable diffuser to generate an output image of the projector to a surrounding environment; and
 a camera module, for capturing the region of the surrounding environment to generate image data;
 wherein the switchable diffuser is controlled by the control signal to have a first mode or a second mode; if the switchable diffuser operates in the first mode, the received lights directly passes through the switchable diffuser, without being diffused or scattered by the switchable diffuser; if the switchable diffuser operates in the second mode, the switchable diffuser diffuses or scatter the received lights; and the switchable diffuser is controlled to operate in the first mode and the second mode alternately.

11. The projector of claim 10, wherein the DOE has a specific pattern, and if the switchable diffuser operates in the first mode, the output image of the projector has the specific pattern; and if the switchable diffuser operates in the second mode, the output image of the projector serves as uniform illumination.

12. The projector of claim 11, further comprising:
 a processor, coupled to the camera module, wherein if the switchable diffuser operates in the first mode, the processor analyzes the image data to obtain depth information of the image data.

13. The projector of claim 12, wherein if the switchable diffuser operates in the second mode, the processor is not configured to obtain the depth information of the image data.

14. The projector of claim 10, further comprising:
- a liquid display panel, wherein part of the liquid display panel serves as the switchable diffuser.

15. A control method of a projector, wherein the projector comprises a light-emitting device, a diffraction optical element (DOE) and a switchable diffuser, and the control method comprises:
- receiving a control signal to control the switchable diffuser to operate in a first mode or a second mode;
- when the switchable diffuser is controlled to operate in the first mode, the switchable diffuser does not diffuse or scatter the received light; and
- when the switchable diffuser is controlled to operate in the second mode, the switchable diffuser diffuses or scatters the received light;
- wherein switchable diffuser is controlled to operate in the first mode and the second mode alternately.

16. The control method of claim 15, wherein the DOE has a specific pattern, a laser beam passes through the DOE and the switchable diffuser to generate an output image of the projector, and the control method comprises:
- when the switchable diffuser operates in the first mode, generating the output image of the projector having the specific pattern; and
- when the switchable diffuser operates in the second mode, the output image of the projector serves as uniform illumination.

* * * * *